United States Patent
Yuan et al.

(10) Patent No.: US 7,136,414 B2
(45) Date of Patent: Nov. 14, 2006

(54) SYSTEM AND METHOD FOR EFFICIENTLY PERFORMING AN INVERSE TELECINE PROCEDURE

(75) Inventors: Hongjun Yuan, San Jose, CA (US); Sheng Qu, San Jose, CA (US); Daniel W. Meyer, San Jose, CA (US)

(73) Assignee: Micronas USA, Inc., Santa Clara, CA (US)

( * ) Notice: Subject to any disclaimer, the term of this patent is extended or adjusted under 35 U.S.C. 154(b) by 85 days.

(21) Appl. No.: 10/941,476

(22) Filed: Sep. 15, 2004

(65) Prior Publication Data
US 2005/0078176 A1    Apr. 14, 2005

Related U.S. Application Data

(60) Provisional application No. 60/506,262, filed on Sep. 25, 2003.

(51) Int. Cl.
*H04B 1/66*    (2006.01)
(52) U.S. Cl. ................................. 375/240.01
(58) Field of Classification Search .......... 375/240.28, 375/240.26, 240.01; 348/441, 459, 97
See application file for complete search history.

(56) References Cited

U.S. PATENT DOCUMENTS

| | | | | |
|---|---|---|---|---|
| 5,812,202 A | * | 9/1998 | Ng et al. | 348/446 |
| 5,821,991 A | * | 10/1998 | Kwok | 348/96 |
| 5,844,618 A | * | 12/1998 | Horiike et al. | 348/441 |
| 6,058,140 A | * | 5/2000 | Smolenski | 375/240.16 |
| 6,525,774 B1 | * | 2/2003 | Sugihara | 348/459 |
| 6,538,688 B1 | * | 3/2003 | Giles | 348/97 |
| 6,724,433 B1 | * | 4/2004 | Lippman | 348/558 |

* cited by examiner

*Primary Examiner*—Tung Vo
(74) *Attorney, Agent, or Firm*—Michael A. Molano; Mayer Brown Rowe & Maw (57) ABSTRACT

A system and method for efficiently performing an inverse telecine procedure includes an inverse telecine module that converts input frames of video information into corresponding output frames by applying an inverse telecine policy to the input frames. A motion statistics generator then calculates motion statistics results corresponding to the output frames. A synchronizer module then compares the motion statistics results to entries in a synchronization table for determining whether the inverse telecine procedure is correctly synchronized. The synchronizer module may then reposition a current start boundary of the inverse telecine procedure whenever the inverse telecine procedure is not correctly synchronized.

41 Claims, 9 Drawing Sheets

| Sequence Number | Input Frames | Output Frames | Motion Statistics Results |
|---|---|---|---|
| 0 | (At, Ab), (At, Bb), (Bt, Cb), (Ct, Cb), (Dt, Db) | (At, Ab)<br>(Bt, Bb)<br>(Ct, Cb)<br>(Dt, Db) | LLLL |
| 1 | (D't, D'b), (At, Ab), (At, Bb), (Bt, Cb), (Ct, Cb) | (D't, D'b)<br>(At, Ab)<br>(Bt, Cb)<br>(Ct, Cb) | LLHL |
| 2 | (At, Ab), (At, Bb), (Bt, Cb), (Ct, Cb), (Dt, Db) | (At, Ab)<br>(Bt, Bb)<br>(Ct, Cb)<br>(Dt, Db) | LHHH |
| 3 | (Ct, Cb), (D't, D'b), (At, Ab), (At, Bb), (Bt, Cb) | (Ct, C'b)<br>(At, D'b)<br>(At, Bb)<br>(At, Bb) | HHLH |
| 4 | (At, A'b), (B't, C'b), (C't, C'b), (D't, D'b), (At, Ab) | (A't, B'b)<br>(C't, C'b)<br>(D't, D'b)<br>(At, Ab) | HLLL |

SYSTEM AND METHOD FOR EFFICIENTLY PERFORMING AN INVERSE TELECINE PROCEDURE

CROSS-REFERENCE TO RELATED APPLICATIONS

This Application relates to, and claims priority in, U.S. Provisional Patent Application Ser. No. 60/506,262, entitled, "Method And System For Performing An Inverse Telecine Procedure," filed on Sep. 25, 2003. The foregoing related Application is commonly assigned, and is hereby incorporated by reference.

BACKGROUND SECTION

1. Field of the Invention

This invention relates generally to techniques for processing video data, and relates more particularly to a system and method for efficiently performing an inverse telecine procedure.

2. Description of the Background Art

Implementing methods for efficiently processing video data is a significant consideration for designers and manufacturers of contemporary electronic entertainment systems. However, processing data may create substantial challenges for system designers. For example, enhanced demands for increased system functionality and performance may require more system processing power and require additional hardware resources. An increase in processing or hardware requirements may also result in a corresponding detrimental economic impact due to increased production costs and operational inefficiencies.

Furthermore, enhanced system capability to perform various advanced operations may provide additional benefits to a system user, but may also place increased demands on the control and management of various system components. For example, an enhanced electronic system that effectively processes video data may benefit from an efficient implementation because of the large amount and complexity of the digital data involved.

Due to growing demands on system resources and substantially increasing data magnitudes, it is apparent that developing new techniques for processing video data is a matter of concern for related electronic technologies. Therefore, for all the foregoing reasons, developing efficient systems for processing video data remains a significant consideration for designers, manufacturers, and users of contemporary electronic systems.

SUMMARY

In accordance with the present invention, a system and method are disclosed for efficiently performing an inverse telecine procedure. In accordance with one embodiment of the present invention, an electronic device initially sets a fail counter equal to zero. Then, an inverse telecine module from the electronic device accesses input frames of video information that have a current start boundary. The inverse telecine module performs an inverse telecine procedure upon the input frames to generate corresponding output frames.

A motion statistics generator then calculates motion statistics values for each of the output frames provided by the inverse telecine module. Next, the motion statistics generator converts the foregoing motion statistics values into corresponding motion statistics results, and provides the motion statistics results to a synchronizer module in the electronic device. The synchronizer module determines whether the foregoing inverse telecine procedure performed by the inverse telecine module is correctly synchronized by referencing a synchronization table in light of the foregoing motion statistics results.

If synchronization of the inverse telecine procedure is correct, then the inverse telecine module may continue to access new input frames and repeat the inverse telecine procedure. However, if synchronization of the inverse telecine module is not correct, then the synchronizer module increments the fail counter by a value of one, and determines whether the fail counter is now equal to a pre-defined failure repeat parameter "N".

If the fail counter is not equal to "N", then the synchronization module may continue to repeatedly evaluate new motion statistics results from the motion statistics generator and increment the fail counter. However, when the fail counter becomes equal to "N", the synchronizer module may reset the fail counter to zero, and then advantageously reposition the current start boundary by referencing a corresponding sequence of input frames from the synchronization table. The present invention thus provides an improved system and method for efficiently performing inverse telecine procedures.

DETAILED DESCRIPTION

The present invention relates to an improvement in video processing techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as system and method for efficiently performing an inverse telecine procedure, and includes an inverse telecine module that converts input frames of video information into corresponding output frames by applying an inverse telecine policy to the input frames. A motion statistics generator then calculates motion statistics results corresponding to the output frames. A synchronizer module may then compare the motion statistics results to entries in a synchronization table for determining whether the inverse telecine procedure is correctly synchronized. The synchronizer module may advantageously reposition a current start boundary of the inverse telecine procedure whenever the inverse telecine procedure is not correctly synchronized.

Figure 1:
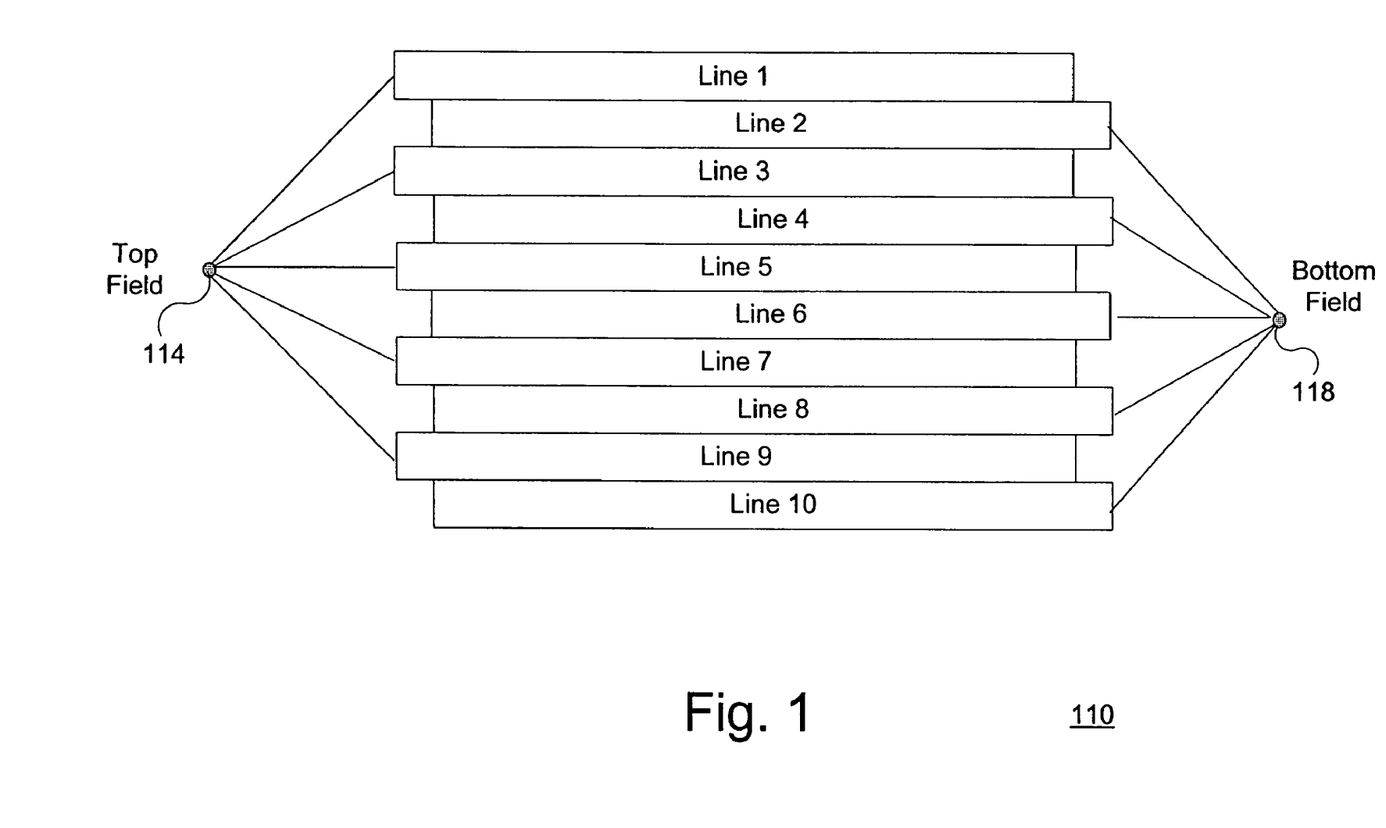
FIG. 1 is a diagram of a frame of interlaced video data, in accordance with one embodiment of the present invention.

Referring now to FIG. 1, a diagram of a frame 110 of interlaced video data is shown, in accordance with one embodiment of the present invention. The FIG. 1 frame 110 is presented for purposes of illustration, and in alternate embodiments, the present invention may readily utilize frames with various components and configurations in addition to, or instead of, certain of those components and configurations discussed in conjunction with the FIG. 1 embodiment. For example, in the FIG. 1 embodiment, frame 110 includes only ten lines of video information (line 1 through line 10). However, in general, video frames typically include a substantially greater number of lines per frame.

In the FIG. 1 embodiment, a top field 114 and a bottom field 118 are interlaced to produce frame 110. For example, top field 114 includes all odd-numbered lines (lines 1, 3, 5, 7, and 9), and bottom field 118 includes all even number lines (lines 2, 4, 6, 8, and 10). The utilization of top fields 114 and bottom fields 118 from corresponding frames 110 for performing inverse telecine procedures is further discussed below in conjunction with FIG. 5 through FIG. 8B.

Figure 2:
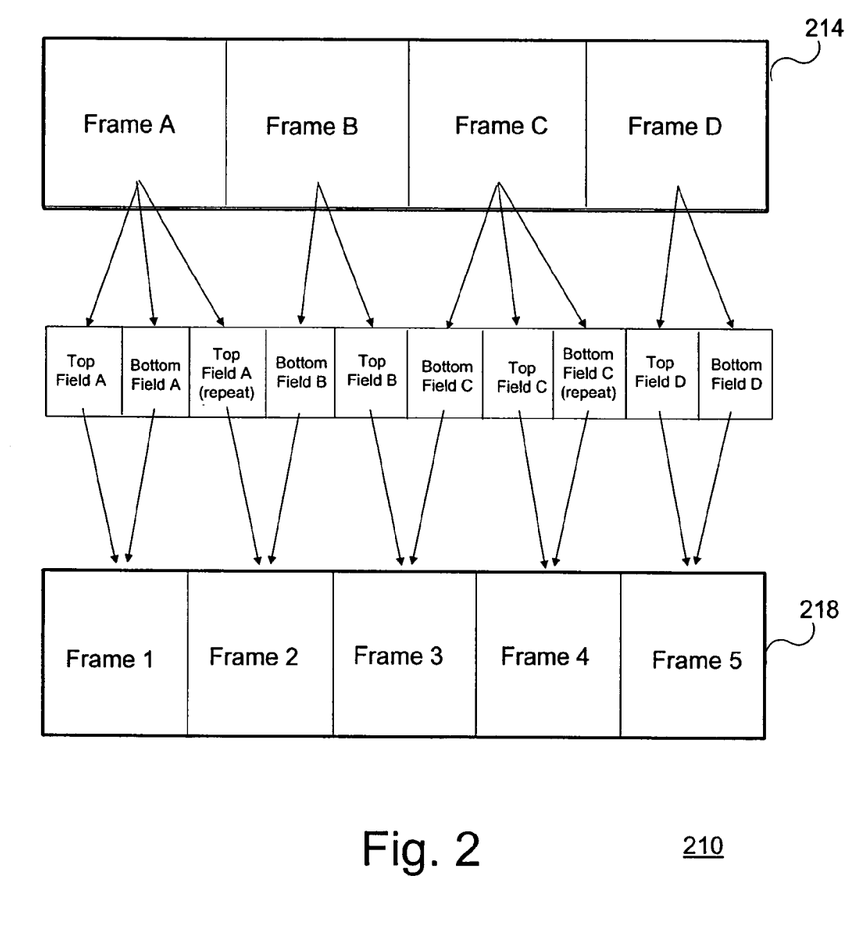
FIG. 2 is a diagram illustrating a telecine procedure in accordance with one embodiment of the present invention.

Referring now to FIG. 2, a diagram illustrating a telecine procedure 210 is shown, in accordance with one embodiment of the present invention. The FIG. 2 embodiment is presented for purposes of illustration, and in alternate embodiments, telecine procedures may be performed using various elements and techniques in addition to, or instead of, certain of those elements and techniques discussed in conjunction with the FIG. 2 embodiment.

In the FIG. 2 embodiment, telecine procedure 210 may be utilized to convert a frame rate of 24 frames-per-second (fps) to a frame rate of 30 fps. Motion pictures are typically captured onto film at a rate of 24 fps, while video frames in a known NTSC format are typically captured and displayed at a rate of 30 fps. The FIG. 2 telecine procedure 210 operates upon four telecine input frames A through D (214) to produce five telecine output frames 1 through 5 (218) by repeating the top field from input frame A (top field A) and by repeating the bottom field of input frame C (bottom field C). The FIG. 2 telecine procedure 210 therefore recombines various top fields and bottom fields from telecine input frames 214 to produce telecine output frames 218, as shown by the various connecting lines of FIG. 2.

More specifically, a top field and a bottom field from input frame A are combined to produce output frame 1, the top field (repeated) from input frame A and a bottom field from input frame B are combined to produce output frame 2, a top field from input frame B and a bottom field from input frame C are combined to produce output frame 3, a top field from input frame C and the bottom field (repeated) from input frame C are combined to produce output frame 4, and a top field and a bottom field from input frame D are combined to produce output frame 5. In accordance with the present invention, an inverse telecine procedure to reverse the results of the FIG. 2 telecine procedure 210 is discussed below in conjunction with FIG. 5.

Figure 3:
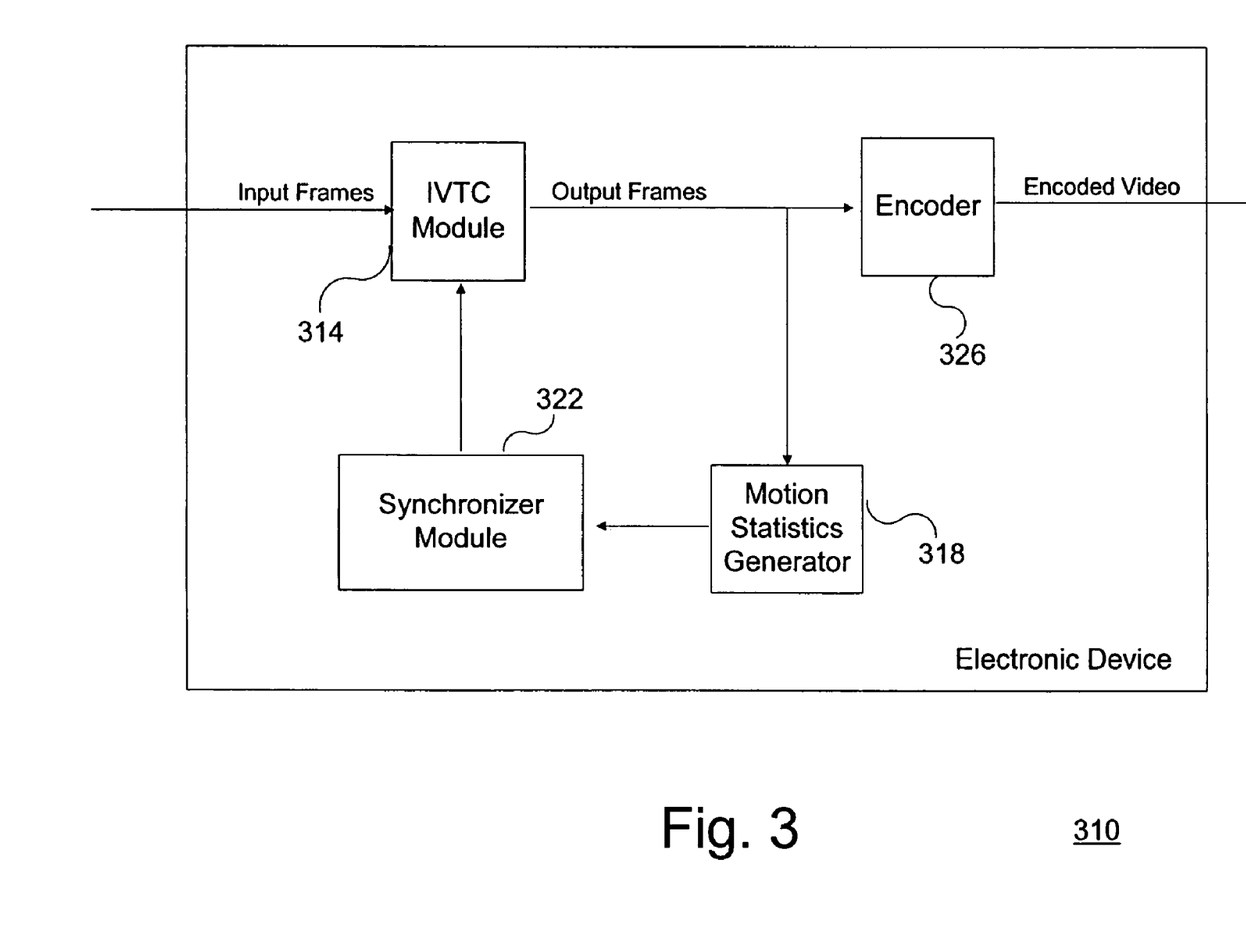
FIG. 3 is a block diagram for one embodiment of an electronic device, in accordance with the present invention.

Referring now to FIG. 3, a block diagram for one embodiment of an electronic device 310 is shown, in accordance with one embodiment of the present invention. In the FIG. 3 embodiment, electronic device 310 includes, but is not limited to, a inverse telecine (IVTC) module 314, a motion statistics generator 318, a synchronizer module 322, and an encoder 326. In alternate embodiments, electronic device 310 may readily include various other components and functionalities in addition to, or instead of, certain of those components and functionalities discussed in conjunction with the FIG. 3 embodiment.

In the FIG. 3 embodiment, electronic device 310 may be implemented in any appropriate manner. For example, in certain embodiments, electronic device 310 may be implemented in hardware as an integrated circuit device. Furthermore, electronic device 310 may be economically implemented without extensive buffer memory resources. In the FIG. 3 embodiment, an inverse telecine (IVTC) module 314 initially receives IVTC input frames of video information at a rate of 30 fps. Inverse telecine module 314 then performs an inverse telecine procedure by applying an inverse telecine policy upon the IVTC input frames to produce IVTC output frames of video information at a rate of 24 fps. In alternate embodiments, various other specific input rates and output rates for inverse telecine module 314 are also contemplated.

In the FIG. 3 embodiment, an encoder 326 may then encode the IVTC output frames from inverse telecine module 314 to produce encoded video data. In accordance with the present invention, a motion statistics generator 318 may also access the IVTC output frames from inverse telecine module 314 for calculating corresponding motion statistics. A synchronizer module 322 then utilizes a feedback control loop to synchronize inverse telecine module 314 based upon the motion statistics received from motion statistics generator 318. The implementation and utilization of synchronizer module 322 is further discussed below in conjunction with FIGS. 4 through 8B.

Figure 4:
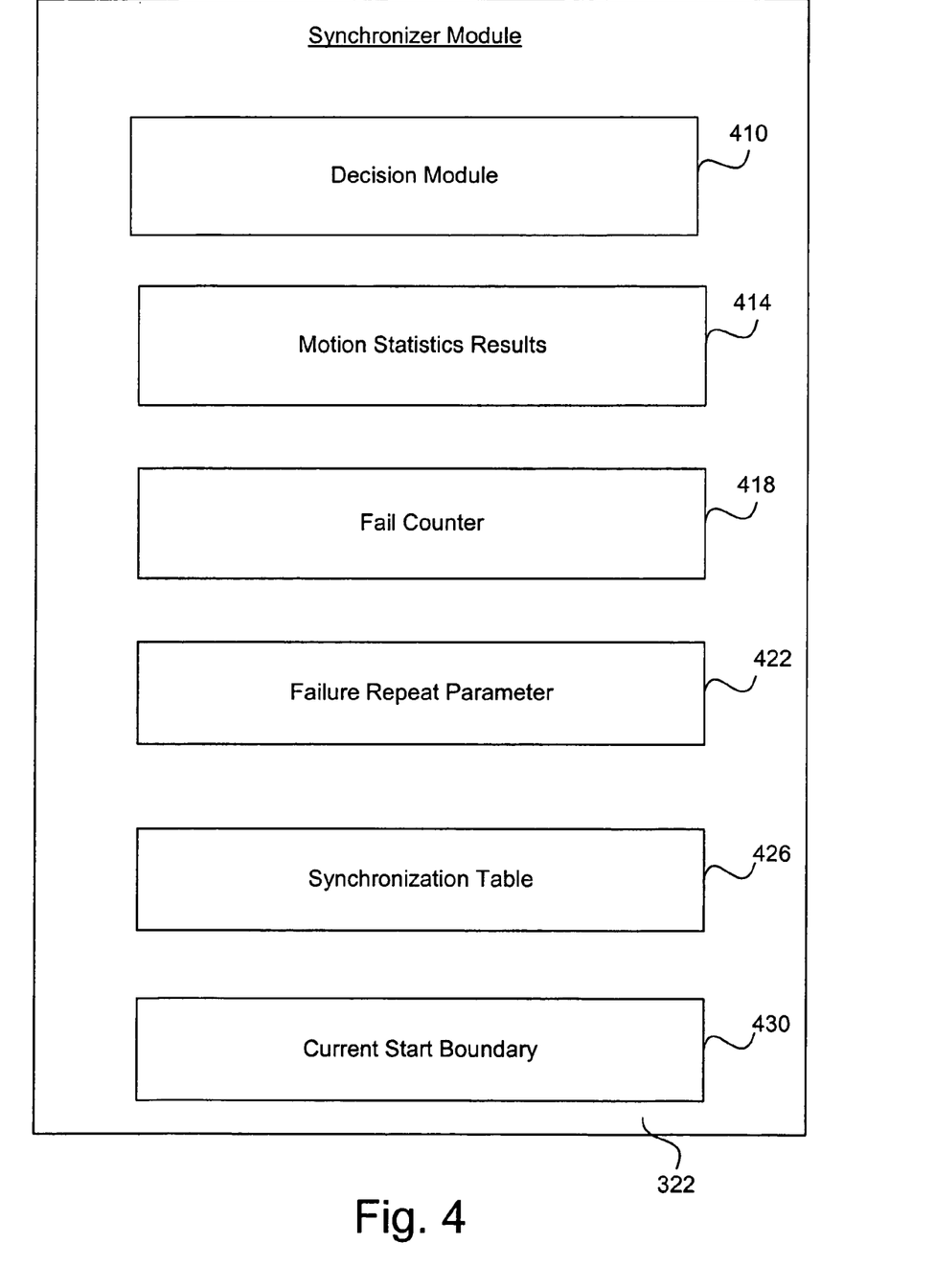
FIG. 4 is a block diagram for one embodiment of the synchronizer module of FIG. 3, in accordance with the present invention.

Referring now to FIG. 4, a block diagram of the FIG. 3 synchronizer module 322 is shown, in accordance with one embodiment of the present invention. In the FIG. 4 embodiment, synchronizer module 322 may include, but is not limited to, a decision module 410, motion statistics results 414, a fail counter 418, a failure repeat parameter 422, a synchronization table 426, and a current start boundary 430. In alternate embodiments, synchronizer module 322 may be implemented using various components and configurations in addition to, or instead of, certain of those components and configurations discussed in conjunction with the FIG. 4 embodiment.

In the FIG. 4 embodiment, decision module 410 manages synchronization procedures for synchronizing inverse telecine procedures performed by inverse telecine module 314 (FIG. 3). Motion statistics results 414 are calculated and provided to synchronizer module 322 by motion statistics generator 318 (FIG. 3). Calculation of motion statistics results is further discussed below in conjunction with FIG. 6.

In the FIG. 4 embodiment, synchronizer module 322 utilizes fail counter 418 to determine when a pre-defined failure repeat parameter 422 has been reached by synchronizer module 322. In the FIG. 4 embodiment, synchronizer module 322 references synchronization table 426 for updating a current start boundary 430 for performing the foregoing inverse telecine procedures with inverse telecine module 314. The utilization of synchronizer module 322 is further discussed below in conjunction with FIGS. 8A and 8B.

Figure 5:
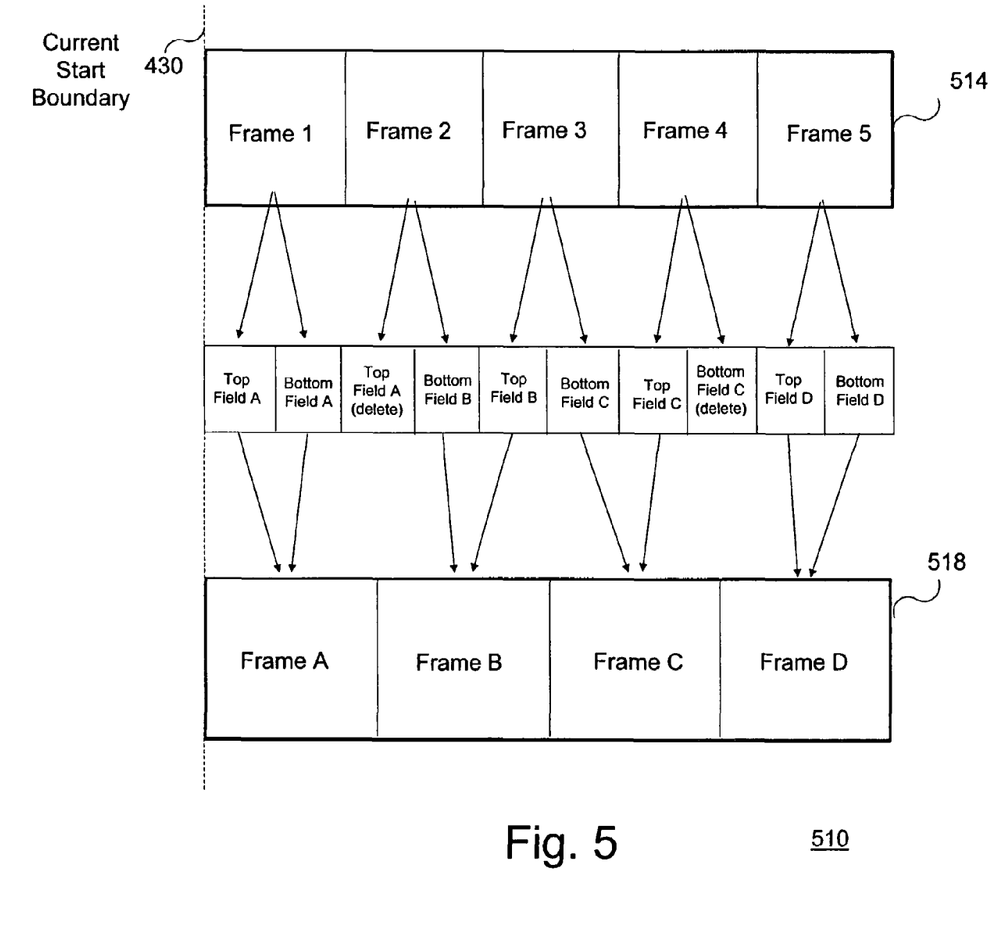
FIG. 5 is a diagram illustrating an inverse telecine procedure, in accordance with one embodiment of the present invention.

Referring now to FIG. 5, a diagram illustrating an inverse telecine procedure 510 is shown, in accordance with one embodiment of the present invention. The FIG. 5 embodiment is presented for purposes of illustration, and in alternate embodiments, the present invention may efficiently perform inverse telecine procedures using various elements and techniques in addition to, or instead of, certain of those elements and techniques discussed in conjunction with the FIG. 5 embodiment.

In the FIG. 5 embodiment, inverse telecine procedure 510 may be utilized to convert a frame rate of 30 frames-per-second (fps) to a frame rate of 24 fps. Video frames in a known NTSC format are typically captured and displayed at a rate of 30 fps, however certain consecutive scanning formats may utilize 24 fps. In addition, removing additional redundant frames from the 30 fps format may provide certain operational benefits for compression procedures performed by encoder 326 (FIG. 3).

In the FIG. 5 embodiment, inverse telecine procedure 510 essentially reverses the telecine procedure 210 discussed above in conjunction with FIG. 2. Therefore, for purposes of consistency, the top fields and bottom fields shown in FIG. 5 are named the same as their counterparts in FIG. 2. The FIG. 5 inverse telecine procedure 510 typically operates upon five IVTC input frames 1 through 5 (514) to produce four IVTC output frames A through D (518) by deleting a top field from input frame 2 (top field A), and by deleting a bottom field of input frame 4 (bottom field C). The FIG. 5 inverse telecine procedure 510 therefore recombines various top fields and bottom fields from IVIC input frames 514 to produce IVTC output frames 518, as shown by the various connecting lines in FIG. 5.

More specifically, a top field and a bottom field from input frame 1 are combined to produce output frame A, a top field from input frame 3 and a bottom field from input frame 2 are combined to produce output frame B, a top field from input frame 4 and a bottom field from input frame 3 are combined to produce output frame C, and a top field from input frame 5 and the bottom field from input frame 5 are combined to produce output frame D.

In the FIG. 5 embodiment, the foregoing inverse telecine procedure should begin with a current start boundary 430 corresponding to input frame 1 of IVTC input frames 514. In certain circumstances in which inverse telecine module 314 performs inverse telecine procedures with current start boundary 430 being defined by an IVTC input frame 514 other than frame 1, the resulting IVTC output frames 518 will incorrectly match top fields and bottom fields from IVTC input frames 514 to produce defective mismatched ITVC output frames 518. In accordance with the present invention, a synchronization procedure may therefore advantageously be performed to optimally synchronize inverse telecine procedures in electronic device 310.

Figure 6:
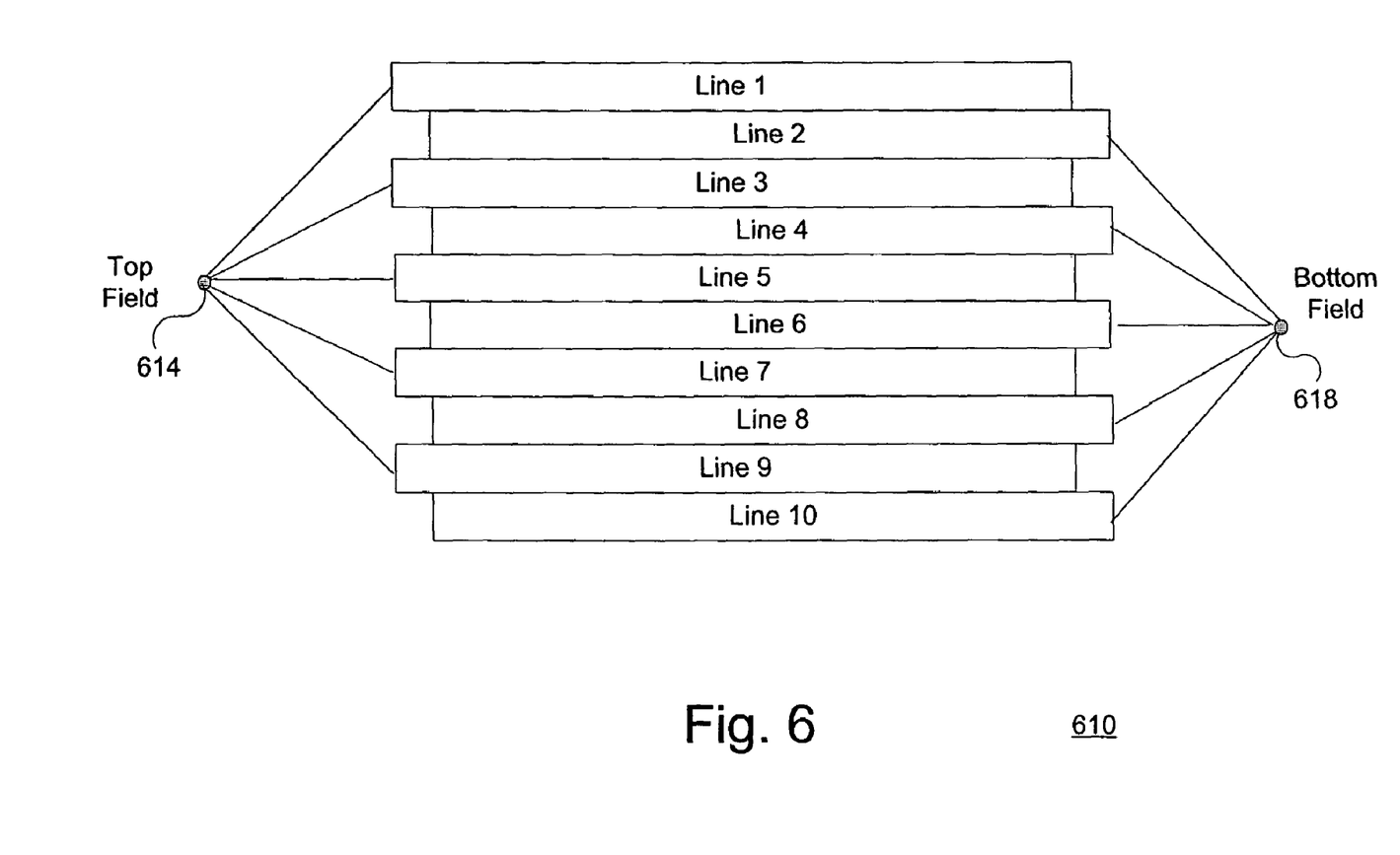
FIG. 6 is a diagram illustrating a calculation procedure for generating motion statistics, in accordance with one embodiment of the present invention.

Referring now to FIG. 6, a diagram illustrating a calculation procedure 610 for generating motion statistics is shown, in accordance with one embodiment of the present invention. In alternate embodiments, the present invention may calculate motion statistics using various elements and techniques in addition to, or instead of, certain of those elements and techniques discussed in conjunction with the FIG. 6 embodiment.

In the FIG. 6 embodiment, motion statistics generator 318 (FIG. 3) generates a motion statistic value that represents how closely a top field 614 (lines 1, 3, 5, 7, and 9) of a given frame 610 corresponds to a bottom field 618 (lines 2, 4, 6, 8, and 10) of that same frame 610. Motion statistics generator 318 may determine the foregoing motion statistics value in any effective and appropriate manner. For example, in certain embodiments, motion statistics generator 318 may generate a motion statistics value for frame 610 by calculating the correlation of neighboring pixels from adjacent lines of frame 610.

In conventional systems, a software program may calculate a different type of motion statistics by comparing entire consecutive frames that are stored in a buffer memory. In accordance with the present invention, inverse telecine module 314 (FIG. 3) advantageously calculates motion statistics values in real time by comparing top and bottom fields on a frame-by-frame basis. Electronic device 310 therefore may be economically and efficiently implemented in hardware without extensive buffer memory to perform inverse telecine procedures.

In the FIG. 6 embodiment, motion statistics generator 318 may calculate motion statistics results that represents the motion statistics values for four consecutive IVTC output frames 518 (FIG. 5). In certain embodiments, motion statistics generator 318 defines an $S_{min}$ value to be equal to a minimum motion statistics value from the four consecutive IVTC output frames 518. Motion statistics generator 318 also defines $S'_i$ to be equal to $S_i$ minus $S_{min}$ where "i" in an index representing one of the four consecutive IVTC output frames 518.

To produce the foregoing motion statistics results, motion statistics generator 318 then marks each of the four consecutive IVTC output frames 518 as an "L" if $S'_i$ is less that a $T_{diff}$ threshold value, and also marks each of the four consecutive IVTC output frames 518 as an "H" if $S'_i$ is greater than or equal to the $T_{diff}$ threshold value. In certain embodiments, $T_{diff}$ is a hard-coded threshold of 512 or 0.15% of the pixel motion for a 720×480 D1-size picture. The motion statistics results therefore provide a result pattern having four individual frame representations of either "L" or "H". Motion statistics generator 318 may then provide the foregoing motion statistics results to synchronizer module 322 for utilization in conjunction with synchronization table 436 (FIG. 4) to perform various IVTC synchronization procedures.

Figure 7:
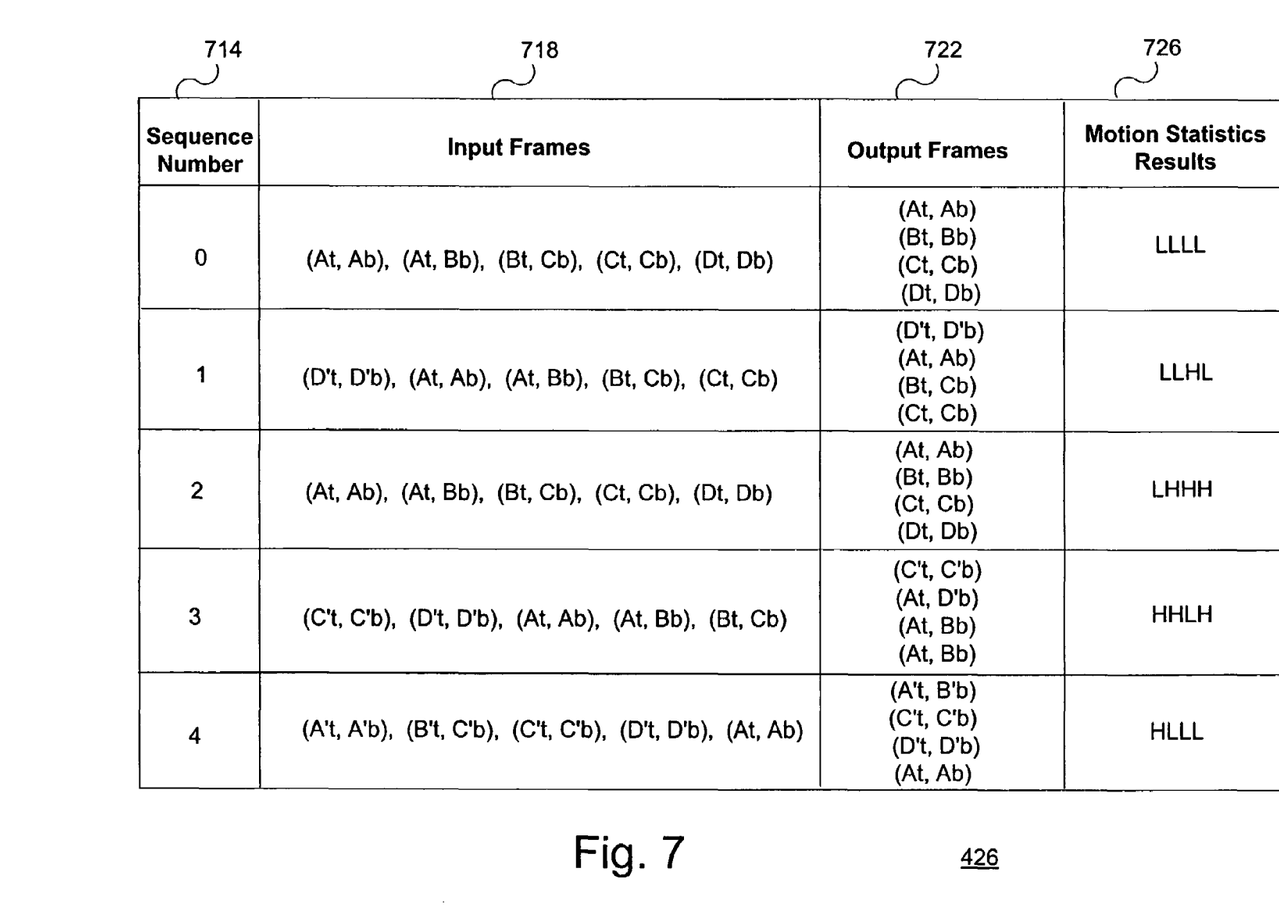
FIG. 7 is an exemplary representation of the synchronization table of FIG. 4, in accordance with one embodiment of the present invention.

Referring now to FIG. 7, one exemplary representation of the FIG. 4 synchronization table 426 is shown, in accordance with one embodiment of the present invention. In alternate embodiments, the present invention may utilize synchronization tables that include various elements and configurations in addition to, or instead of, certain of those elements and configurations discussed in conjunction with the FIG. 7 embodiment.

In the FIG. 7 embodiment, synchronization table 426 includes a sequence number column 714, an input frames column 718, an output frames column 722, and a motion statistics results column 726. Each row of the input frames column 718 includes a horizontal sequence of input frames 514 (FIG. 5) with a current start boundary 430 located before the first input frame on the extreme left side of input frames column 718. Similarly, each row of the output frames column 722 includes a vertical sequence of output frames 518 (FIG. 5).

In the notation utilized in synchronization table 426, each input frame 514 and each output frame 518 is represented by a top field and a bottom field enclosed by parentheses and separated by a comma. For example, the first output frame 518 of sequence number 0 is represented as "(At, Ab)". In addition, each field in synchronization table 426 is represented by a left-side uppercase letter corresponding to one of four sequential output frames 518 (A, B, C, or D), as discussed above in conjunction with FIG. 5. Furthermore, each field in synchronization table 426 is represented by a right-side lowercase letter corresponding to either a top field ("t") or a bottom field ("b"), as discussed above in conjunction with FIG. 5. Therefore, for example, a top field from an original frame A (see FIG. 2) may be represented as "At".

In the FIG. 7 embodiment, synchronizer module 322 advantageously matches motion statistics results from motion statistics generator 318 with the motion statistics results in motion statistics results column 726 to identify the present location of current start boundary 430 (FIG. 5). In the FIG. 7 embodiment, current start boundary 430 is initially located before the first input frame 514 in input frames column 718. However, current start boundary 430 should always correctly be positioned as shown in sequence number 0 (with motion statistics results of "LLLL") for successful synchronization of inverse telecine procedures.

Therefore, in accordance with the present invention, when motion statistics results are not "LLLL", synchronizer module 322 may then reposition/update current start boundary 430 to lie immediately prior to frame (At, Ab) to ensure optimal inverse telecine synchronization. The utilization of synchronization table 426 is further discussed below in conjunction with FIG. 8B.

Figure 8A:
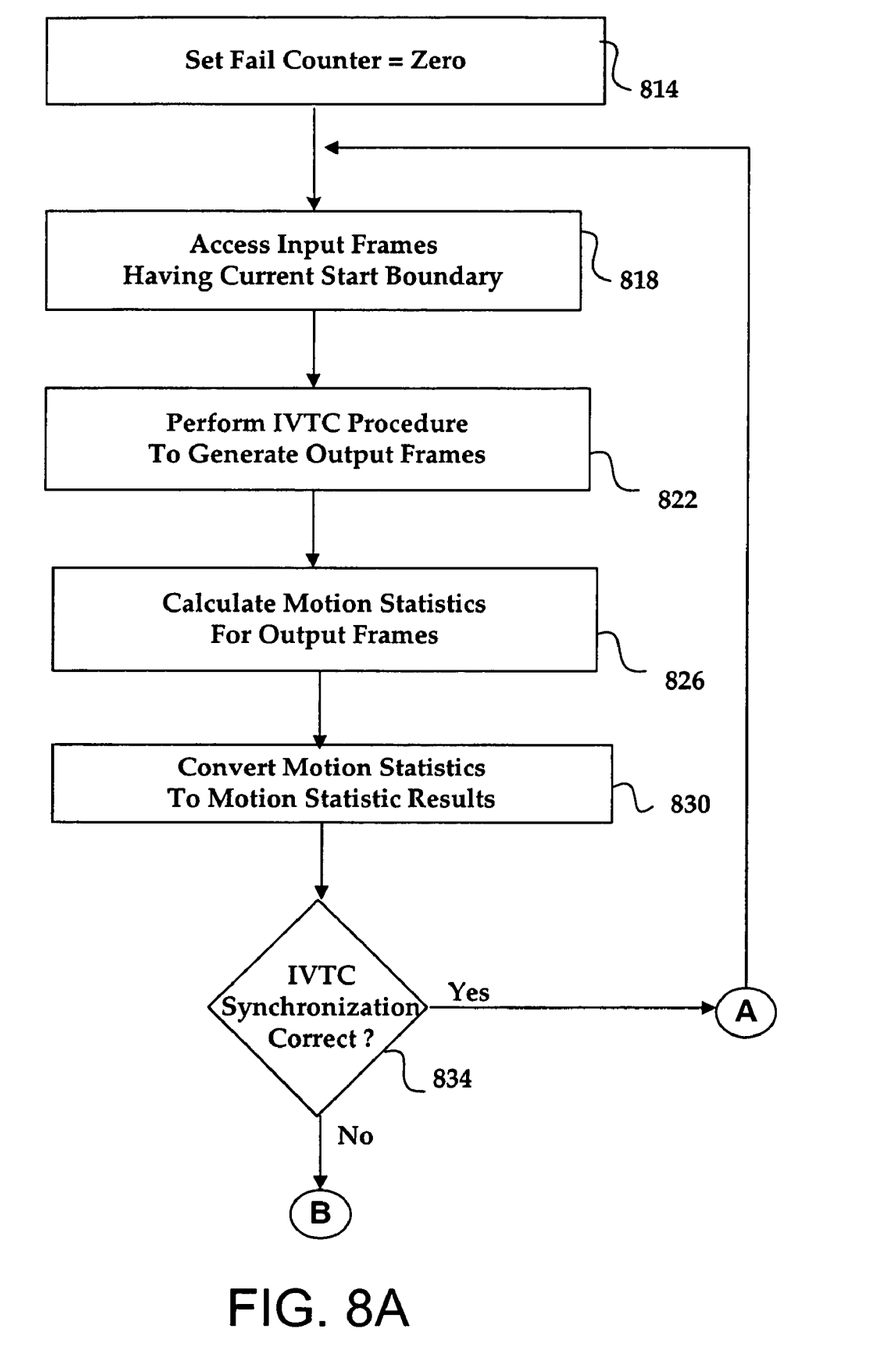
FIGS. 8A and 8B are a flowchart of method steps for efficiently performing an inverse telecine procedure, in accordance with one embodiment of the present invention.
Figure 8B:
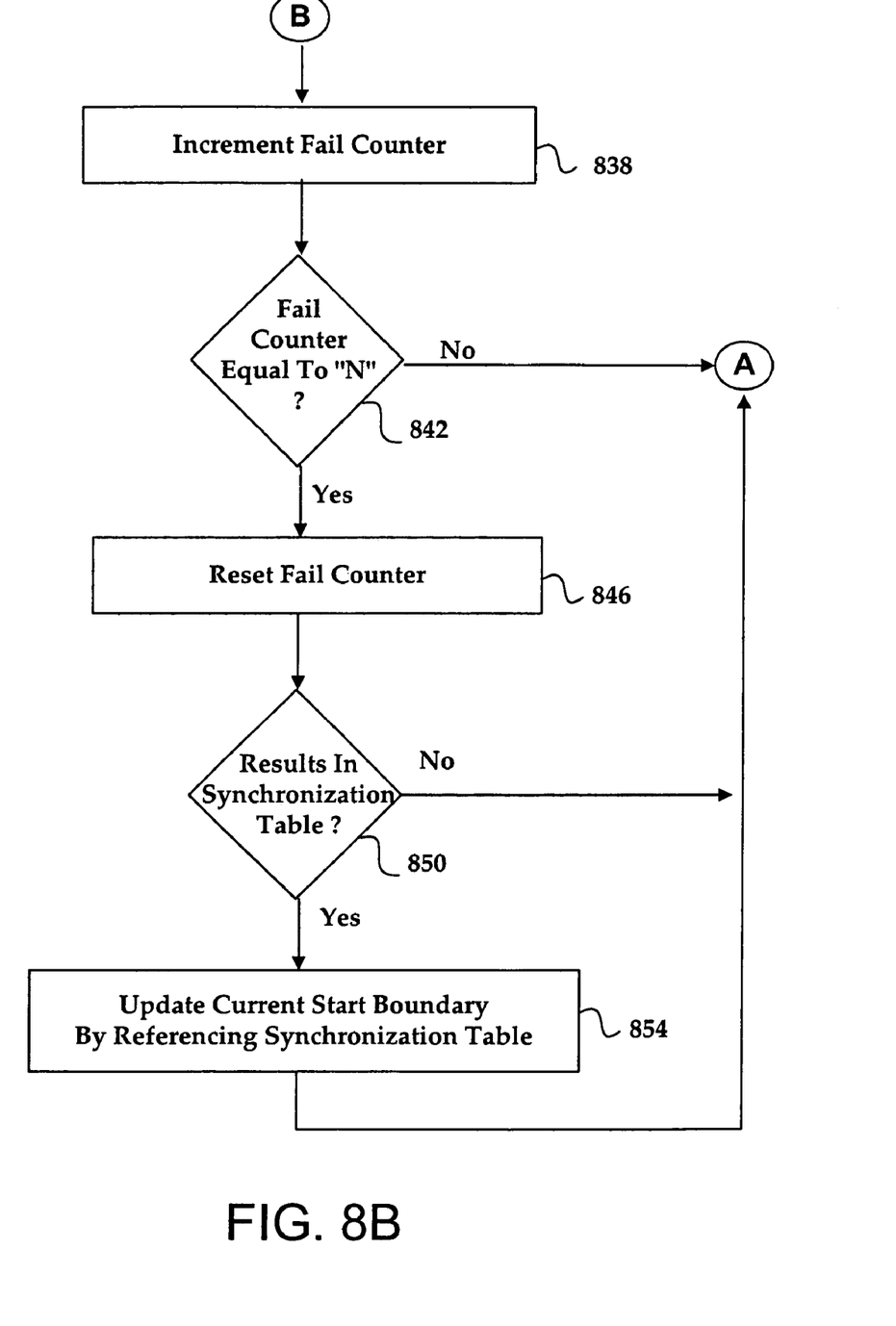

Referring now to FIGS. 8A and 8B, a flowchart of method steps for efficiently performing an inverse telecine procedure is shown, in accordance with one embodiment of the present invention. FIGS. 8A and 8B are presented for purposes of illustration, and in alternate embodiments, the present invention may readily utilize various steps and sequences other than those discussed in conjunction with the embodiment presented in FIGS. 8A and 8B.

In the FIG. 8A embodiment, in step 814, synchronizer module 322 initially sets fail counter 418 equal to zero. Then in step 818, inverse telecine module 314 accesses input frames 514 having a current start boundary 430. In step 822, inverse telecine module 314 performs an inverse telecine procedure to generate output frames 518, as discussed above in conjunction with FIG. 5.

In step 826, a motion statistics generator 318 calculates motion statistics values for each of the output frames 518 provided by inverse telecine module 314. Next, in step 830, motion statistics generator 318 converts the foregoing motion statistics values into corresponding motion statistics results, as discussed above in conjunction with FIG. 6. Motion statistics generator 318 also then provides the motion statistics results to synchronizer module 322.

In step 834, synchronizer module 322 determines whether the inverse telecine synchronization is correct in inverse telecine module 314 by referencing a synchronization table 426 in light of the foregoing motion statistics results, as discussed above in conjunction with FIG. 7. If the inverse telecine synchronization is correct, then the FIG. 8A process may loop back to step 818 to access new input frames 514 and repeat the FIG. 8A process. However, if the inverse telecine synchronization is not correct, then the FIG. 8A process may advance to step 838 of FIG. 8B through letter "B".

In step 838, synchronizer module 322 increments fail counter 418 by a value of one. Then, in step 842, synchronizer module 322 determines whether fail counter 418 is equal to a pre-defined failure repeat parameter "N" (422). Failure repeat parameter 422 may be pre-defined as any effective value. In certain embodiments, failure repeat parameter 422 is pre-defined to be equal to the number "4". Failure repeat parameter 422 therefore causes synchronizer module 322 to repeatedly re-evaluate new motion statistics results to ensure that the current start boundary 430 actually requires correction for proper synchronization of inverse telecine module 314.

In step 842, if fail counter 418 is not equal to "N", then the FIG. 8B process may return to step 818 of FIG. 8A to access new input frames 514 and repeat the FIG. 8A process. However, if fail counter 418 is equal to "N", then in step 846, synchronizer module 322 resets fail counter 418 to zero. In step 850, synchronizer module 322 determines whether the motion statistics results received from motion statistics generator 318 are present in motion statistics results column 726 of synchronization table 426.

In step 854, if the motion statistics results received from motion statistics generator 318 are present in synchronization table 426, then synchronizer module 322 updates current start boundary 430 by referencing synchronization table 426 to thereby correctly synchronize inverse telecine procedures performed by inverse telecine module 314, as discussed above in conjunction with FIG. 7. The FIG. 8B process may then return to step 818 of FIG. 8A to continue performing inverse telecine procedures in a synchronized manner. The present invention thus provides an improved system and method for efficiently performing inverse telecine procedures.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing an inverse telecine procedure, comprising:
   an inverse telecine module that converts input frames into output frames by applying an inverse telecine policy to said input frames;
   a motion statistics generator that calculates motion statistics results corresponding to said output frames; and
   a synchronizer module that compares said motion statistics results to a synchronization table for determining whether said inverse telecine procedure is correctly synchronized, said synchronizer module repositioning a current start boundary of said inverse telecine procedure whenever said inverse telecine procedure is not correctly synchronized.

2. The system of claim 1 wherein said inverse telecine policy removes pre-defined fields from said input frames to convert an initial number of said input frames into a reduced number of said output frames.

3. The system of claim 1 wherein said inverse telecine procedure converts said input frames in a 30 frames-per-second format into said output frames in a 24 frames-per-second format, said inverse telecine module repeatedly converting five of said input frames into four of said output frames.

4. The system of claim 1 wherein said inverse telecine module, said motion statistics module, and said synchronizer module are embodied in a integrated circuit device that performs said inverse telecine procedure in real-time on a frame-by-frame basis without utilizing extensive buffer memory.

5. The system of claim 1 wherein said integrated circuit device includes a video encoder that encodes said output frames into encoded video data.

6. The system of claim 1 wherein said motion statistics generator calculates said motion statistics results by comparing a top field and a bottom field from each of said output frames to determine whether one or more field mismatches are detected for each of said output frames, said one or more field mismatches indicating that said inverse telecine procedure is not correctly synchronized.

7. The system of claim 1 wherein said motion statistics generator recalculates said motion statistics results for new input frames a pre-determined number of times, said synchronizer module repositioning said current start boundary only when said motion statistics results are repeated said pre-determined number of times.

8. The system of claim 7 wherein said synchronizer module utilizes a fail counter to determine whether said motion statistics results have been repeated said pre-determined number of times.

9. The system of claim 1 wherein said synchronization table includes rows of potential input frame sequences with corresponding potential motion statistics results.

10. The system of claim 9 wherein each of said potential input frame sequences indicates a different current start boundary location for said inverse telecine procedure.

11. The system of claim 1 wherein said synchronization module initially sets a fail counter equal to zero, said inverse telecine module then accessing said input frames having an initial location for said current start boundary, said inverse telecine module generating said output frames by dropping pre-defined fields from said input frames according to said inverse telecine policy.

12. The system of claim 11 wherein said motion statistics generator calculates motion statistics values for each of said output frames by comparing top fields and bottom fields of said output frames.

13. The system of claim 12 wherein said motion statistics generator calculates said motion statistics results by defining an $S_{min}$ to be equal to a minimum motion statistics value from consecutive output frames, said motion statistics generator also defining an $S'_i$ to be equal to an $S_i$ minus said $S_{min}$ where said $S_i$ represents said motion statistics values from said consecutive output frames, said motion statistics generator then marking each of said consecutive output frames as an "L" if said $S'_i$ is less that a $T_{diff}$ threshold value, said motion statistics generator also marking each of said consecutive output frames as an "H" if $S'_i$ is greater than or equal to said $T_{diff}$ threshold value.

14. The system of claim 11 wherein said synchronizer module matches said motion statistics results to a corresponding sequence of said input frames from said synchronization table to evaluate whether said current start boundary is correctly positioned.

15. The system of claim 14 wherein said synchronizer module does not reposition said current start boundary when said inverse telecine procedure is correctly synchronized.

16. The system of claim 14 wherein said synchronizer module increments said fail counter by a value of one after matching said motion statistics results to a corresponding sequence of said input frames from said synchronization table.

17. The system of claim 16 wherein said synchronization module resets said fail counter to zero when said fail counter equals a pre-determined repeat parameter.

18. The system of claim 14 wherein said synchronizer module does not reposition said current start boundary when said motion statistics results are not present in said synchronization table.

19. The system of claim 17 wherein said synchronizer module repositions said current start boundary when said motion statistics results continue to indicate that said inverse telecine procedure is incorrectly synchronized after said motion statistics results have been repeatedly calculated according to said failure repeat parameter.

20. The system of claim 1 wherein an encoder device performs a video encoding procedure that sequentially encodes each said output frames while said synchronizer module repositions said current start boundary for said inverse telecine procedure.

21. A method for performing an inverse telecine procedure, comprising:
converting input frames into output frames by utilizing an inverse telecine module to apply an inverse telecine policy to said input frames;
calculating motion statistics results corresponding to said output frames by utilizing a motion statistics generator;
utilizing a synchronizer module to compare said motion statistics results to a synchronization table for determining whether said inverse telecine procedure is correctly synchronized; and
repositioning a current start boundary of said inverse telecine procedure with said synchronizer module whenever said inverse telecine procedure is not correctly synchronized.

22. The method of claim 21 wherein said inverse telecine policy removes pre-defined fields from said input frames to convert an initial number of said input frames into a reduced number of said output frames.

23. The method of claim 21 wherein said inverse telecine procedure converts said input frames in a 30 frames-per-second format into said output frames in a 24 frames-per-second format, said inverse telecine module repeatedly converting five of said input frames into four of said output frames.

24. The method of claim 21 wherein said inverse telecine module, said motion statistics module, and said synchronizer module are embodied in a integrated circuit device that performs said inverse telecine procedure in real time on a frame-by-frame basis without utilizing extensive buffer memory.

25. The method of claim 21 wherein said integrated circuit device includes a video encoder that encodes said output frames into encoded video data.

26. The method of claim 21 wherein said motion statistics generator calculates said motion statistics results by comparing a top field and a bottom field from each of said output frames to determine whether one or more field mismatches are detected for each of said output frames, said one or more field mismatches indicating that said inverse telecine procedure is not correctly synchronized.

27. The method of claim 21 wherein said motion statistics generator recalculates said motion statistics results for new input frames a pre-determined number of times, said synchronizer module repositioning said current start boundary only when said motion statistics results are repeated said pre-determined number of times.

28. The method of claim 27 wherein said synchronizer module utilizes a fail counter to determine whether said motion statistics results have been repeated said pre-determined number of times.

29. The method of claim 21 wherein said synchronization table includes rows of potential input frame sequences with corresponding potential motion statistics results.

30. The method of claim 29 wherein each of said potential input frame sequences indicates a different current start boundary location for said inverse telecine procedure.

31. The method of claim 21 wherein said synchronization module initially sets a fail counter equal to zero, said inverse telecine module then accessing said input frames having an initial location for said current start boundary, said inverse telecine module generating said output frames by dropping pre-defined fields from said input frames according to said inverse telecine policy.

32. The method of claim 31 wherein said motion statistics generator calculates motion statistics values for each of said output frames by comparing top fields and bottom fields of said output frames.

33. The method of claim 32 wherein said motion statistics generator calculates said motion statistics results by defining an $S_{min}$ to be equal to a minimum motion statistics value from consecutive output frames, said motion statistics generator also defining an $S'_i$ to be equal to an $S_i$ minus said $S_{min}$ where said $S_i$ represents said motion statistics values from said consecutive output frames, said motion statistics generator then marking each of said consecutive output frames as an "L" if said $S'_i$ is less that a $T_{diff}$ threshold value, said motion statistics generator also marking each of said consecutive output frames as an "H" if $S'_i$ is greater than or equal to said $T_{diff}$ threshold value.

34. The method of claim 31 wherein said synchronizer module matches said motion statistics results to a corresponding sequence of said input frames from said synchronization table to evaluate whether said current start boundary is correctly positioned.

35. The method of claim 34 wherein said synchronizer module does not reposition said current start boundary when said inverse telecine procedure is correctly synchronized.

36. The method of claim 34 wherein said synchronizer module increments said fail counter by a value of one after matching said motion statistics results to a corresponding sequence of said input frames from said synchronization table.

37. The method of claim 36 wherein said synchronization module resets said fail counter to zero when said fail counter equals a pre-determined repeat parameter.

38. The method of claim 34 wherein said synchronizer module does not reposition said current start boundary when said motion statistics results are not present in said synchronization table.

39. The method of claim 37 wherein said synchronizer module repositions said current start boundary when said motion statistics results continue to indicate that said inverse telecine procedure is incorrectly synchronized after said motion statistics results have been repeatedly calculated according to said failure repeat parameter.

40. The method of claim 21 wherein an encoder device performs a video encoding procedure that sequentially encodes each said output frames while said synchronizer module repositions said current start boundary for said inverse telecine procedure.

41. A system for performing an inverse telecine procedure, comprising:
means for converting input frames into output frames by applying an inverse telecine policy to said input frames;
means for calculating motion statistics results corresponding to said output frames;
means for comparing said motion statistics results to a synchronization table for determining whether said inverse telecine procedure is correctly synchronized; and
means for repositioning a current start boundary of said inverse telecine procedure whenever said inverse telecine procedure is not correctly synchronized.

* * * * *